(12) United States Patent
Fulignoli et al.

(10) Patent No.: US 12,273,185 B2
(45) Date of Patent: Apr. 8, 2025

(54) OPTICAL TRANSPORT NETWORK PROTECTION ARCHITECTURE, NODES AND METHOD

(71) Applicant: Telefonaktiebolaget LM Ericsson (publ), Stockholm (SE)

(72) Inventors: Annamaria Fulignoli, Genoa (IT); Stefano Orsi, Genoa (IT); Riccardo Ceccatelli, Genoa (IT); Stefano Parodi, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 170 days.

(21) Appl. No.: 18/005,205

(22) PCT Filed: Jul. 17, 2020

(86) PCT No.: PCT/EP2020/070393
§ 371 (c)(1),
(2) Date: Jan. 12, 2023

(87) PCT Pub. No.: WO2022/012763
PCT Pub. Date: Jan. 20, 2022

(65) Prior Publication Data
US 2023/0224067 A1 Jul. 13, 2023

(51) Int. Cl.
*H04J 14/02* (2006.01)
*H04B 10/40* (2013.01)
(Continued)

(52) U.S. Cl.
CPC .......... *H04J 14/0294* (2013.01); *H04B 10/40* (2013.01); *H04B 10/50* (2013.01); *H04B 10/60* (2013.01); *H04J 2203/006* (2013.01)

(58) Field of Classification Search
None
See application file for complete search history.

(56) References Cited

U.S. PATENT DOCUMENTS

2002/0109876 A1* 8/2002 Eijk ................... H04Q 11/0066
398/58
2007/0053364 A1* 3/2007 Boutaud De La Combe .............
H04L 12/4633
370/395.53
(Continued)

FOREIGN PATENT DOCUMENTS

| EP | 2393237 A1 | 12/2011 |
| EP | 2775733 A1 | 9/2014 |
| JP | 2009105723 A * | 5/2009 |

OTHER PUBLICATIONS

International Search Report and Written Opinion dated Apr. 19, 2021 for International Application No. PCT/EP2020/070393 filed Jul. 17, 2020; consisting of 13 pages.

*Primary Examiner* — Darren E Wolf
(74) *Attorney, Agent, or Firm* — Weisberg I.P. Law, P.A.

(57) ABSTRACT

A communications network remote node having a downstream optical circuit configured to receive downstream, DS, optical signals from an active main node and from a standby main node, the downstream optical circuit switchable between a working mode and a protection mode. Optical receivers are configured to receive the demultiplexed downstream optical signals and output encapsulated downstream client signals. Optical transmitters are configured to receive encapsulated upstream client signals and to transmit upstream, US, optical signals at upstream wavelengths carrying the encapsulated upstream client signals. An upstream optical circuit is configured to multiplex the upstream optical signals carrying the encapsulated upstream client signals and to send the upstream optical signals to both main nodes. Processing circuitry is configured to extract downstream client signals and alignment data from encapsulated downstream client signals and form encapsulated upstream client (Continued)

signals by encapsulating upstream client signals and alignment data.

18 Claims, 9 Drawing Sheets

(51) Int. Cl.
*H04B 10/50* (2013.01)
*H04B 10/60* (2013.01)

(56) References Cited

U.S. PATENT DOCUMENTS

2011/0135302 A1* 6/2011 Kang ............... H04L 45/62
398/43
2015/0249874 A1* 9/2015 Katagiri ............ H04Q 11/0005
398/49

* cited by examiner

OPTICAL TRANSPORT NETWORK PROTECTION ARCHITECTURE, NODES AND METHOD

CROSS-REFERENCE TO RELATED APPLICATIONS

This application is a Submission Under 35 U.S.C. § 371 for U.S. National Stage Patent Application of International Application Number: PCT/EP2020/070393, filed Jul. 17, 2020 entitled "OPTICAL TRANSPORT NETWORK PROTECTION ARCHITECTURE, NODES AND METHOD," the entirety of which is incorporated herein by reference.

TECHNICAL FIELD

The invention relates to a communications network remote node, a communications network main node and an optical transport network. The invention further relates to a method of optical transport network failure protection.

BACKGROUND

To minimize disaster losses in telecommunications networks, operators and service providers duplicate their valuable sites, such as data centers, baseband unit hotels, application servers etc., to ensure data and service availability. In a disaster protection scenario involving baseband unit hotels, a Tower company provides network infrastructure to the wireless telecommunications industry, which is then shared among multiple network operators. A Tower company scenario typically consists of several remote sites with radio units, RRUs, belonging to several network operators and one or more Main sites with baseband unit, BBU, hotels, BBH, of several network operators. The optical paths between the remote sites and the main site must be protected and the BBU hotel at the main site should be duplicated at a geographically distinct location for disaster recovery.

Several challenges are associated with network virtualization, including real time baseband processing algorithm implementation and dynamic processing capacity allocation to deal the dynamic cell loan in centralized radio access networks, C-RAN. The creation of BBH at a central location leads to security concerns and requires effective disaster recovery solutions.

C-RAN requires a robust transport system to address the high bandwidth and stringent jitter and latency requirements of 4G and 5G, as discussed in "5G New Radio RAN and transport choices that minimize TCO", Ericsson Technology review of 7 Nov. 2019. Wavelength division multiplexing, WDM, optical transport may meet these requirements; it is transparent to the client optical interface and suits 100G, 10G, and sub-10G with any client interface mix. Single fiber solutions save half of the fiber resources needed for WDM optical transport. This has a large economic impact on carriers, fiber providers and enterprises.

SUMMARY

It is an object to provide an improved communications network remote node. It is a further object to provide an improved communications network main node. It is a further object to provide an improved optical transport network. It is a further object to provide an improved method of optical transport network failure protection.

An aspect of the invention provides a communications network remote node comprising a downstream optical circuit, a plurality of optical receivers, a plurality of optical transmitters, an upstream optical circuit and processing circuitry. The downstream optical circuit is configured to receive downstream, DS, optical signals at downstream wavelengths from an active main node and from a standby main node. The downstream optical circuit is switchable between a working mode and a protection mode; in the working mode the downstream optical circuit is configured to demultiplex downstream optical signals carrying encapsulated client signals received from the active main node and in the protection mode the downstream optical circuit is configured to demultiplex downstream optical signals carrying encapsulated client signals received from the standby main node. The optical receivers are configured to receive the demultiplexed downstream optical signals and output encapsulated downstream client signals. The optical transmitters are configured to receive encapsulated upstream client signals and to transmit upstream, US, optical signals at upstream wavelengths carrying the encapsulated upstream client signals. The upstream optical circuit is configured to multiplex the upstream optical signals carrying the encapsulated upstream client signals and to send said upstream optical signals to both the active main node and the standby main node. The processing circuitry is configured to perform operations of extracting downstream client signals and alignment data from encapsulated downstream client signals, and forming encapsulated upstream client signals by encapsulating upstream client signals and alignment data.

The remote node enables a disaster recovery protection architecture that is self-confined in the optical domain, with a bidirectional communication channel always up between active and standby main nodes and between each of the main nodes and the remote node. Because the routing is self-contained in the optical domain, it can be protocol independent, with client signals encapsulated in an appropriate frame structure, the remote node can be applied in various network scenarios, including data centre interconnect, DCI, and centralised radio access networks, C-RAN. Since the remote node makes use of the layer 1 frame to transmit alignment data, faster disaster recovery of valuable sites is possible as compared to disaster recovery implemented using protocols of higher layers in the OSI stack. This enables a clear demarcation between the transport network domain and Server-Client services enabling a disaster recovery architecture including the remote node to be applied to existing networks without changing them.

In an embodiment, the downstream optical circuit comprises an optical demultiplexer and an optical switch. The optical demultiplexer is configured to demultiplex the downstream optical signals carrying encapsulated client signals. The optical switch comprises a first input, a second input, a first output, a second output and a 2×2 switch fabric. The first input is configured to receive the downstream optical signals from the active main node. The second input is configured to receive the downstream optical signals from the standby main node. The first output is connected to the optical demultiplexer and the second output is connected to the optical bandpass filter. The 2×2 switch fabric interconnects the first and second inputs with the first and second outputs, and the 2×2 switch fabric is reconfigurable to switch between the working mode and the protection mode. Switching between the working and protection modes, i.e. protection switching, is thus self-contained in the optical domain, with the 2×2 switch fabric ensuring that downstream optical signals reach the optical receivers irrespective of which main node they are received from. This ensures continuity of service for client signals and enables a communication channel to be always up from the active main node to the standby main node, via the remote node, and from the respective main node (dependent on whether the downstream optical circuit is in the working mode or the protection mode) and the remote node.

In an embodiment, the communications network remote node further comprises an auxiliary optical receiver configured to receive a downstream optical signal from the standby main node in the working mode and to receive a downstream optical signal from the active main node in the protection mode; the downstream optical signal carries an encapsulated status signal from the respective main node. The auxiliary optical receiver is configured to output the encapsulated status signal. The processing circuitry is further configured to extract status data from the encapsulated status signal, the status data indicative of a status relating to said respective main node. This enables a bidirectional communication channel to be always up between active and standby main nodes, via the remote node, and between the respective main node (dependent on whether the downstream optical circuit is in the working mode or the protection mode) and the remote node.

In an embodiment, the downstream optical circuit additionally comprises an optical bandpass filter configured to select one of a plurality of downstream optical signals received from the standby main node in the working mode and to select one of a plurality of downstream optical signals received from the active main node in the protection mode. The said downstream optical signals each carry the encapsulated status signal from the respective main node. The remote node is advantageously able to receive a plurality of downstream optical signals each carrying the encapsulated status signal, so the sending main node and the remote node do not need to agree a wavelength for sending the frame status signal.

In an embodiment, the optical bandpass filter is a tunable optical bandpass filter configurable to select one of a plurality of downstream optical signals carrying the status signal. This advantageously enables the remote node to change to selecting a different downstream wavelength, in the event that the downstream optical signal at an initially selected wavelength experiences a failure. This provides protection for communication of status signals to the remote node.

In an embodiment, the processing circuitry is additionally configured to perform extracting status data from encapsulated downstream client signals. The status data is indicative of a status relating to the main node from which the downstream optical signals carrying the encapsulated downstream client signals are received. This advantageously enables the remote node to be aware of the status of main nodes connected to it.

In an embodiment, the processing circuitry is additionally configured to perform extracting status data from encapsulated downstream client signals received from a standby main node. The processing circuitry is further configured to perform inserting the status data into the encapsulated upstream client signals. The remote node is thus able to transmit the status data to the active main node.

In an embodiment, the status data is indicative of at least one of a status of the standby main node and an alignment status of configuration data of the standby main node. The remote node is thus able to transmit alignment status data from the standby main node to the active main node.

In an embodiment, the processing circuitry is further configured to perform determining a protection status based on the status data and generating a control signal configured to cause the downstream optical circuit to switch between the working mode and the protection mode. Protection switching decisions can thus be rapidly and autonomously taken by the remote node, which contributes to reducing protection switching time and speeds up consequent recovery from a disaster event. This advantageously enables the remote node to be aware of the status of main nodes connected to it, so that protection switching, i.e. switching the downstream optical circuit between the working and protection modes, can be performed with knowledge of the status of the standby main node, i.e. so protection switching decisions are not made blind by the remote node.

In an embodiment, the processing circuitry is further configured to perform inserting protection status data into the encapsulated upstream client signals. The protection status data indicative of which of the working mode or the protection mode the downstream optical circuit is configured in. The remote node is thus able to communicate the protection status to main nodes connected to it, enabling the main nodes to be configured appropriately as active or standby main nodes.

In an embodiment, the processing circuitry is configured to extract downstream client signals from payload parts of the encapsulated downstream client signals and to extract alignment data from header parts of the encapsulated downstream client signals. The processing circuitry is further configured to form encapsulated upstream client signals by inserting upstream client signals into payload parts of frames and inserting alignment data into header parts of said frames. The remote node thus enables communication of alignment data from the active main node to the standby main node in a protocol independent way, enabling the standby main node to be always aligned with the active main node, ready to assume operation as the active main node in the event of failure at the currently active main node and in response to protection switching being implemented by the remote node.

Corresponding embodiments and advantages apply also to the optical transport network and method described below.

An aspect of the invention provides a communications network main node comprising a plurality of optical transmitters, an optical multiplexer, an optical demultiplexer, a plurality of optical receivers and processing circuitry. The optical transmitters are configured to receive encapsulated downstream signals and to transmit downstream, DS, optical signals carrying the encapsulated downstream signals at downstream wavelengths. The optical multiplexer is configured to multiplex the downstream optical signals carrying the encapsulated downstream signals. The optical demultiplexer is configured to demultiplex upstream, US, optical signals carrying encapsulated upstream signals. The optical receivers are configured to receive the demultiplexed upstream optical signals and output encapsulated upstream signals. The processing circuitry is configured to perform working mode operations of receiving downstream client signals and forming encapsulated downstream signals by encapsulating the downstream client signals and alignment data, extracting upstream client signals and alignment data from encapsulated upstream signals.

The main node enables a disaster recovery protection architecture that is self-confined in the optical domain, with a bidirectional communication channel always up between active and standby main nodes and between each of the main nodes and a remote node. Because the routing is self-contained in the optical domain, it can be protocol independent, with client signals encapsulated in an appropriate frame structure, the main node can be applied in various network scenarios, including data centre interconnect, DCI, and centralised radio access networks, C-RAN. Since the main node makes use of the layer 1 frame to transmit alignment data, faster disaster recovery of valuable sites is possible as compared to disaster recovery implemented using protocols of higher layers in the OSI stack. This enables a clear demarcation between the transport network domain and Server-Client services enabling a disaster recovery architecture including the main node to be applied to existing networks without changing them.

In an embodiment, the forming encapsulated downstream signals comprises inserting the downstream client signals into payload parts of frames and inserting alignment data into header parts of said frames. The extracting comprises extracting upstream client signals from payload parts of the encapsulated upstream client signals and extracting alignment data from header parts of the encapsulated upstream client signals. The main node thus enables communication of alignment data from a main node configured as an active main node to a further main node configured as a standby main node in a protocol independent way, enabling main nodes to be always aligned with each other, so that one is always ready to assume operation in the event of failure at the other.

In an embodiment, the processing circuitry is additionally configured to receive status data indicative of a status relating to the node. The working mode operations further comprise inserting the status data into the header parts of the encapsulated downstream client signals. The processing circuitry is additionally configured to perform protection mode operations of forming an encapsulated status signal and inserting the status data into a header part of the encapsulated status signal. At least one of the optical transmitters is configured to receive the encapsulated status signal and to transmit at least one downstream optical signal carrying the encapsulated status signal. This enables the main node to report status data to a remote node, so that the remote node can make protection switching decisions in knowledge of the status of the main node.

In an embodiment, the processing circuitry is configured to receive status data from the standby main node. The protection mode operations comprise inserting the status data into the encapsulated downstream client signals. The standby main node is thus able to transmit status data to the remote note.

In an embodiment, the status data in indicative of at least one of a status of the standby main node and an alignment status of configuration data of the standby main node. The standby main node is thus able to transmit alignment status data to the remote node, for relay to the active main node.

In an embodiment, the working mode operations further include extracting protection status data from the encapsulated upstream signals. The protection mode operations further include extracting protection status data from the encapsulated upstream signals. The processing circuitry is additionally configured to switch between the active mode and the standby mode dependent on the protection status data. The protection status data indicative of which of the working mode or the protection mode a remote node to which the main node is connected is configured in. The main node is thus able to configure itself as either an active main node or a standby main node depending on the protection status data.

Corresponding embodiments and advantages apply also to the optical transport network and method described below.

An aspect of the invention provides an optical transport network comprising a communications network remote node as described above, an active communications network main node as described above, a standby communication network main node as described above, a first optical link between the active communications network main node and the communications network remote node and a second optical link between the standby communications network main node and the communications network remote node.

The optical transport network provides a disaster recovery protection architecture that is self-confined in the optical domain, with a bidirectional communication channel always up between the active and the standby main nodes and between each of the main nodes and the remote node. Because the disaster protection architecture is self-contained in the optical domain it is protocol independent, so it can be applied in various network scenarios, including data centre interconnect, DCI, and centralised radio access networks, C-RAN.

The optical transport network makes use of the layer 1 frame to transmit alignment data, resulting in faster disaster recovery of valuable sites being possible as compared to disaster recovery implemented using protocols of higher layers in the OSI stack. The alignment data may, for example, comprise configuration data of the active main node required to configure the active main node to, for example, communicate with a network management system, NMS. It enables a clear demarcation between the transport network domain and Server-Client services enabling the disaster recovery architecture provided by the optical transport network to be applied to existing networks without changing them.

Recovery time following protection switching may be minimised, since the configuration of the standby main node is always aligned to the configuration of the active main node, as a result of the transmission of the alignment data between them, without requiring an external communication infrastructure. The optical transport network enables a protection switching decision to be rapidly and autonomously taken by the remote node entity, which also contributes to reducing the protection switching time and speeding up consequent recovery from a disaster event.

An aspect of the invention provides a method of optical transport network failure protection. The method comprises, at an active main node, the following steps. Steps of receiving downstream client signals and forming encapsulated downstream signals by encapsulating the downstream client signals and alignment data. A step of transmitting downstream optical signals carrying the encapsulated downstream signals at downstream wavelengths. Steps of receiving upstream optical signals carrying encapsulated upstream signals and obtaining the encapsulated upstream signals from the upstream optical signals. A step of extracting upstream client signals and alignment data from the encapsulated upstream signals. The method comprises, at a remote node, the following steps. A step of receiving downstream optical signals from the active main node and the standby main node. A step of demultiplexing downstream optical signals carrying encapsulated downstream client signals received from the active main node. A step of obtaining the encapsulated downstream client signals from the downstream optical signals. A step of extracting downstream client signals and alignment data from the encapsulated downstream client signals. A step of forming encapsulated upstream client signals by encapsulating upstream client signals and alignment data. A step of transmitting upstream optical signals to both the active main node and the standby main node, the upstream optical signals having upstream wavelengths and carrying the encapsulated upstream client signals.

In an embodiment, the method further comprises, at a standby main node, the following steps. A step of receiving status data indicative of a status relating to the standby main node. Steps of forming an encapsulated status signal and inserting the status data into a header part of the encapsulated status signal. A step of transmitting a downstream optical signal carrying the encapsulated status signal. The method further comprises, at the remote node, a step of receiving the downstream signal carrying the encapsulated status signal and a step of extracting the status data from the encapsulated status signal.

In an embodiment, the method further comprises, at the remote node, a step of extracting status data from header parts of the encapsulated downstream client signals. The status data is indicative of a status relating to the main node from which the downstream client signals are received.

In an embodiment, the method further comprises, at the remote node, a step of inserting the status data into the encapsulated upstream client signals.

In an embodiment, the status data received from the standby main node relates to at least one of a status of the standby main node and an alignment status of configuration data of the standby main node. The remote node is thus able to transmit alignment status data from the standby main node to the active main node.

In an embodiment, the method further comprises, at the remote node, a step of determining a protection status based on the status data and a step of inserting protection status data into the encapsulated upstream client signals. The protection status data is indicative of which of a working mode or a protection mode the remote node is operating in.

In an embodiment, the method further comprises, at the active main node and at the standby main node, steps of extracting the protection status data from the encapsulated upstream signals.

In an embodiment, the method further comprises, at the active main node, a step of inserting status data into the downstream client signals. The status data is indicative of a status of the active main node.

Embodiments of the invention will now be described, by way of example only, with reference to the accompanying drawings.

DETAILED DESCRIPTION

The same reference numbers will used for corresponding features in different embodiments.

Embodiments provide a disaster recovery protection architecture, self-confined in the optical domain, with a bidirectional communication channel always up between active and standby main nodes, and between each one of them and a remote node. This is made possible due to the structure of the Remote node which allows to maintain up an interconnection among the three nodes irrespective of the protection switching status of the remote node. In this way it is possible to keep the current standby main node always aligned with the currently active main node and ready to assume the active role when necessary.

A bidirectional intercommunication channel is provided between the main nodes, via the remote node, to transmit alignment data from an active main node to a standby main node and to provide the necessary information for protection switching. The alignment data transmitted by an active main node may comprise configuration data to enable the active main node to, for example, communicate with a network management system, NMS. The bidirectional intercommunication channel is also provided to transmit status data between the main nodes. The status data may be indicative of a status of the main node. The status data sent from a standby main node may also be indicative of a status of alignment data; for example, an acknowledgement of receipt of configuration data from the active main node or a response to a request from the active main node. The bidirectional intercommunication channel thus enables alignment of alignment data, such as configuration data, of a standby main node with that of an active main node. The same intercommunication channel may also be used to convey information related to the status of servers connected to the main nodes, as well as of the main nodes themselves, and of the working and protection optical links, so that the remote node can make protection switching decisions according to a criterion that can be also customized according to the information available at any time at the remote node.

Figure 1:
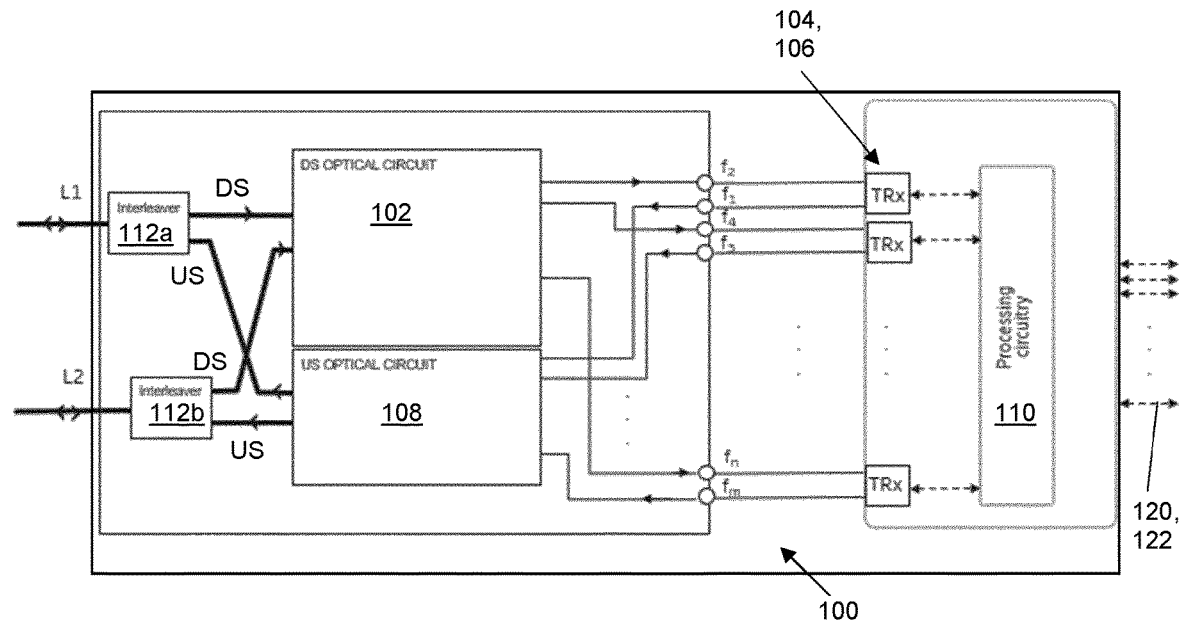
FIGS. 1 to 5 are block diagrams illustrating communications network remote nodes according to embodiments.

An embodiment of the invention provides a communications network remote node 100, as illustrated in FIG. 1. The remote node 100 comprises a downstream, DS, optical circuit 102, optical receivers 104, optical transmitters 106, an upstream, US, optical circuit 108, processing circuitry 110 and interleavers 112.

The remote node is configured for single fibre working, SFW, having a first interleaver 112a for connection to a first optical link, L1, and a second interleaver 112b for connection to a second optical link, L2; each optical link, L1, L2, comprises a single optical fibre. The interleavers are configured to interleave downstream, DS, optical signals at DS wavelengths, for example even wavelengths/frequencies ($f_2$, $f_4$, ... $f_n$), and upstream, US, optical signals at US wavelengths (different to the DS wavelengths), for example odd wavelengths/frequencies ($f_1$, $f_3$, ... $f_m$).

The interleavers 112 are configured to route DS optical signals from the respective optical link, L1, L2, to the DS optical circuit 102 and are configured to route US optical signals from the US optical circuit 108 to the respective optical link L1, L2. Downstream optical signals at downstream wavelengths may be received from an active main node and from a standby main node.

The DS optical circuit 102 is configured to receive the DS optical signals from the interleavers. The DS optical circuit is switchable between a working mode and a protection mode. In the working mode the DS optical circuit is configured to demultiplex DS optical signals carrying encapsulated client signals received from the active main node. In the protection mode the DS optical circuit is configured to demultiplex DS optical signals carrying encapsulated client signals received from the standby main node.

The optical receivers 104 and the optical transmitters 106 are provided in this example as a plurality of optical transceivers, TRX. The optical receivers are configured to receive the demultiplexed DS optical signals from the DS optical circuit, detect the DS optical signals and output encapsulated DS client signals. The optical transmitters 106 are configured to receive encapsulated US client signals, from, for example, the client server, and to transmit US optical signals at US wavelengths carrying the encapsulated US client signals.

The US optical circuit 108 is configured to multiplex the US optical signals carrying the encapsulated US client signals and to output the US optical signals to both interleavers 112, for routing to the respective optical link, L1, L2, for sending to both the active main node and the standby main node. The US optical signals, carrying the US encapsulated client signals, are therefore transmitted from the remote node towards both main nodes.

The processing circuitry 110 is configured to receive the encapsulated DS client signals from the optical receivers 104 and is configured to extract the DS client signals from the encapsulated DS client signals and to extract alignment data from the encapsulated DS client signals. The processing circuitry outputs the extracted DS client signals 120, for routing to, for example, a client server. The processing circuitry is configured to receive US client signals 122, from, for example, the client server, and is configured to form encapsulated US client signals by encapsulating the received US client signals and alignment data. The alignment data included in the encapsulated US client signals includes the alignment data extracted from the DS client signals; the processing circuitry enables communication of alignment data between an active main node and a standby main node interconnected via the remote node 100.

The client signals may be framed signals, such as client signals framed according to the common public radio interface, CPRI, standard for transmission between a base station and a remote radio unit.

Figure 2:
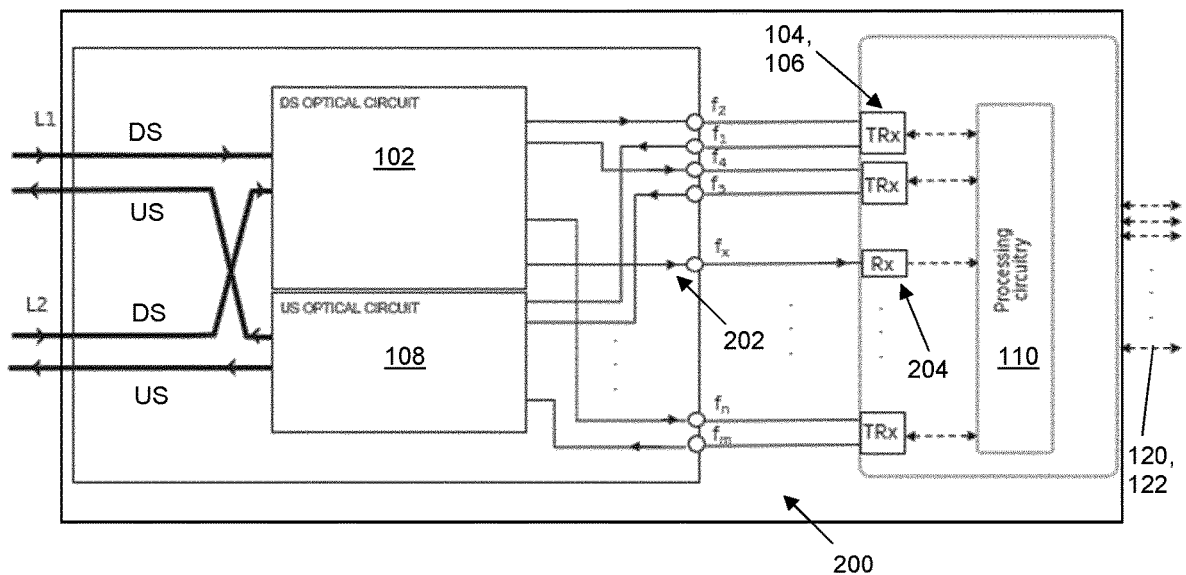

An embodiment of the invention provides a communications network remote node 200, as illustrated in FIG. 2. The remote node of this embodiment is configured for dual fibre working, DFW. Each optical link, L1, L2, comprises two optical fibres, one for DS optical signals and one for US optical signals; the remote node 200 therefore does not include the interleavers of the previous embodiment.

In this embodiment, the remote node 200 additionally comprises an auxiliary optical receiver, Rx, 204 configured to receive a DS optical signal. This DS optical signal is received from the standby main node when the DS optical circuit is configured in the working mode and is received from the active main node when the DS optical circuit is configured in the protection mode. In each case, the DS optical signal carries an encapsulated status signal from the respective main node. The auxiliary optical receiver 204 is configured to detect the DS optical signal and to output the encapsulated status signal. The processing circuitry 110 configured to extract status data from the encapsulated status signal. The status data is indicative of a status relating to the respective main node from which the DS optical signal carrying the encapsulated status signal was received.

In an embodiment, the processing circuitry 110 is configured to perform extracting status data from encapsulated DS client signals received from a standby main node. The status data received from the standby main node relates to a status of the standby main node and/or an alignment status of alignment data, such as configuration data, of the standby main node. The processing circuitry 110 is configured insert the status data relating to the alignment status of standby main node configuration data into the encapsulated US client signals. The alignment status data may, for example, comprise an acknowledgement of receipt of configuration data from the active main node or a response to a request from the active main node. The remote node 100 is thus able to transmit alignment status data received from a standby main node to an active main node.

Figure 3:
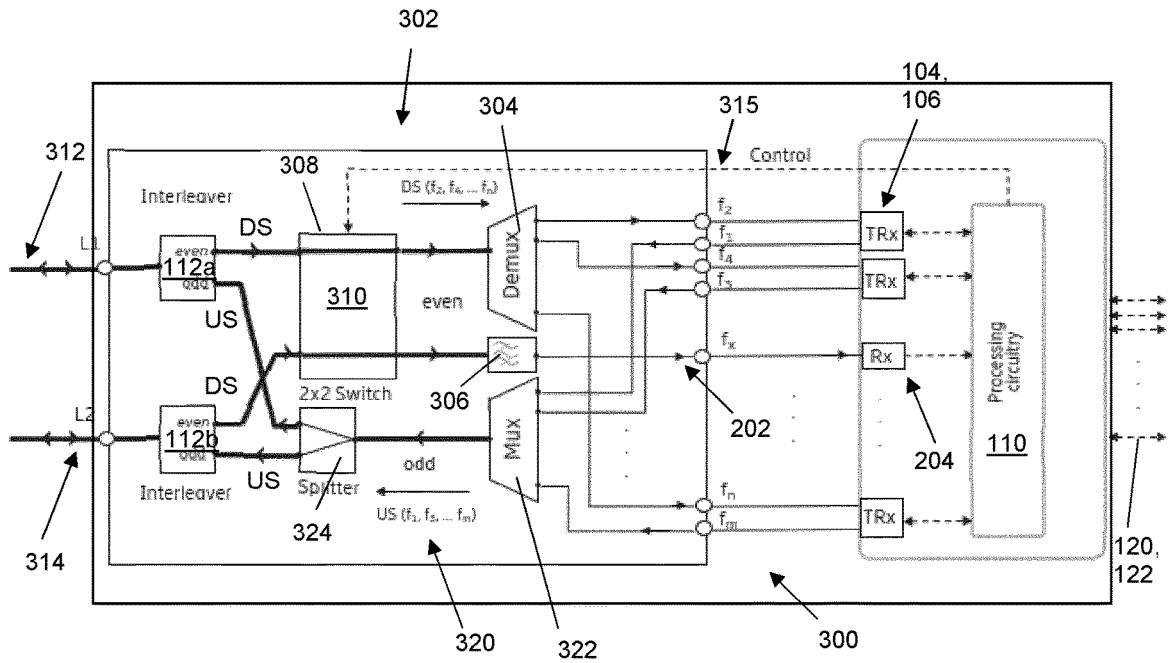
Figure 4:
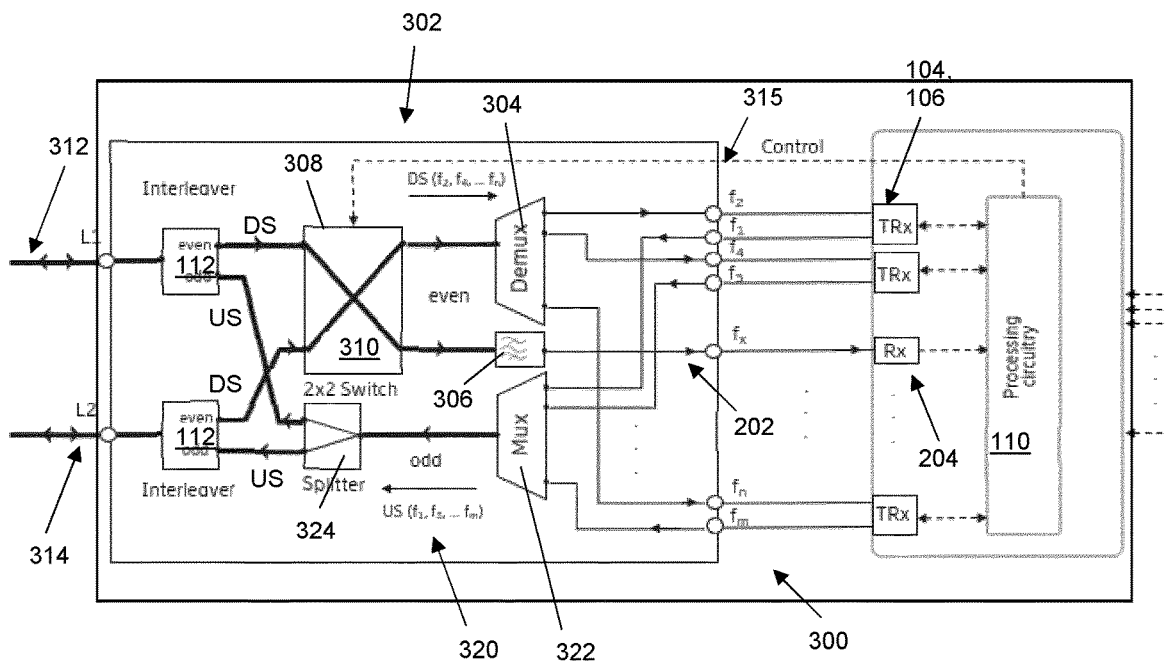

An embodiment of the invention provides a communications network remote node 300, similar to the remote node 100, as illustrated in FIGS. 3 and 4.

The DS optical circuit 302 in this embodiment comprises an optical demultiplexer, Demux, 304 and an optical switch 308.

The optical switch 308 comprises first and second inputs, first and second outputs, and a 2×2 switch fabric 310. The first input is configured to receive DS optical signals from the first interleaver 112a, which is configured to be connected to the first optical link, L1, comprising a single optical fibre 312, for connection to an active main node. The second input is configured to receive DS optical signals from the second interleaver 112b, which is configured to be connected to the first optical link, L1, comprising a single optical fibre 312, for connection to a standby main node.

The first output is connected to the demux 304 and the second output is connected to an optical bandpass filter 306, configured to select one of the DS optical signals 202 for routing to the auxiliary Rx, 204. The demux is configured to wavelength demultiplex the DS optical signals, at the DS (even) wavelengths, carrying encapsulated client signals.

The 2×2 switch fabric 310 interconnects the first and second inputs with the first and second outputs. The 2×2 switch fabric is reconfigurable to switch between a bar-state (shown in FIG. 3) and a cross-state (shown in FIG. 4). When the 2×2 switch fabric is in the bar-state the DS optical circuit is in the working mode, in which DS optical signals from the first interleaver 112a (i.e. from the active main node) are connected to the demux, and when the 2×2 switch fabric is in the cross-state the DS optical circuit is in the protection mode, in which DS optical signals from the second interleaver 112b (i.e. from the standby main node) are connected to the demux.

The upstream optical circuit comprises an optical multiplexer, Mux, 322 and an optical splitter 324. The mux is configured to multiplex US optical signals carrying US encapsulated client signals, received from the optical transmitters 106. The optical splitter is configured to power split the multiplexed US optical signals received from the mux and to output the power split multiplexed US optical signals towards both the first interleaver 112a (for routing on link L1 to the active main node) and the second interleaver 112b (for routing on link L2 to the standby main node). In this way, the US optical signals carrying the US encapsulated client signals are sent to both active and standby main nodes that the remote node 300 is connected to, via the first and second SFW optical fibres 312.

The DS optical circuit 302 additionally comprises an optical bandpass filter 306 configured to select one of a plurality of DS optical signals received from the standby main node in the working mode and to select one of a plurality of DS optical signals received from the active main node in the protection mode. The DS optical signals each carry an encapsulated status signal, comprising status data relating to the respective main node, as described above.

The bandpass filter 306 may be a fixed wavelength bandpass filter, configured to transmit a fixed one of the DS wavelengths, or may be a tunable bandpass filter, which may be configured to transmit any one of the DS wavelengths. Use of a tunable bandpass filter provides the advantage of enabling protection for the status signal relating to the standby main node, since the selected DS wavelength can be changed if there is a failure of an originally selected DS wavelength; the status signal is received on all DS optical signal wavelengths from the standby node. As an alternative, two fixed wavelength bandpass filters may be provided, connected to the DS optical circuit by a 1×2 optical switch, to enable failure protection for transmission of the status signal.

The DS optical circuit 302 and the US optical circuit 320 are mainly passive, with the exception of the optical 2×2 optical switch 310 which is directly commanded by control signals 315 from the processing circuitry 110. The optical circuits are shown here in a compact format with all the elements in a single unit, but it will be appreciated that the elements could be split into different units as an alternative implementation without affecting operation of the remote node 300.

The processing circuitry 110 may be a field programmable gate array, FPGA, or an application specific integrated circuit, ASIC. The processing circuitry is configured to include a destination address, Unicast MAC address or dedicated fields in the US encapsulated client signal, so that each main node receiving the US optical signals can determine whether the US encapsulated client signals are intended for it.

The optical receivers 104 convert the coloured optical signals received from an active main node into grey (digital) signals to be sent to a client unit. The processing circuitry manages the communication between the active main node and the standby main node, ensuring also a full-duplex communication channel between the active main node and the standby main node.

In an embodiment, the processing circuitry 110 is further configured to perform determining a protection status based on the received status data, which may relate to the status of the respective main node, a server connected to the main node or fault detection relating to the connections between the server and the main node, or the main node and the remote node. The processing circuitry is configured to generate a control signal 315 configured to cause the DS optical circuit to switch between the working mode and the protection mode according to the determined protection status.

In an embodiment, the processing circuitry 110 is further configured to insert protection status data into the encapsulated upstream client signals. The protection status data is indicative of which of the working mode or the protection mode the DS optical circuit is configured in. The protection status data may be used by a main node to determine whether it should reconfigure itself or remain in its current configuration (active or standby).

The protection status data may be coded in two bits in the encapsulated US optical signals and sent constantly in US optical signals to both the active main node and the standby main node.

In an embodiment, the processing circuitry 110 is configured to extract DS client signals from payload parts of the encapsulated DS client signals and to extract alignment data from header parts of the encapsulated DS client signals. The processing circuitry is further configured to form encapsulated US client signals by inserting US client signals into payload parts of frames and inserting alignment data into header parts of the frames. The frame may have a proprietary frame structure or a standard frame structure, for example, an optical transport network, OTN, frame, may be used. Specific bytes are reserved within the frame header for the alignment data, protection status data and status data. Specific bytes may also be reserved within the frame or frame header of US client signals for the address of the destination main node. The protection status data may be coded in two bits of the frame and may be sent constantly in encapsulated US client signals. The status data relating to the status of the main node may comprise a 'heartbeat' indicative that the main node is operational.

The protection status, PS, data may be coded in two bits in the frame and sent constantly encapsulated US client signals. For example, the protection status may be coded as PS=10 for working mode operation and may be coded as PS=01 in protection mode operation.

Figure 5:
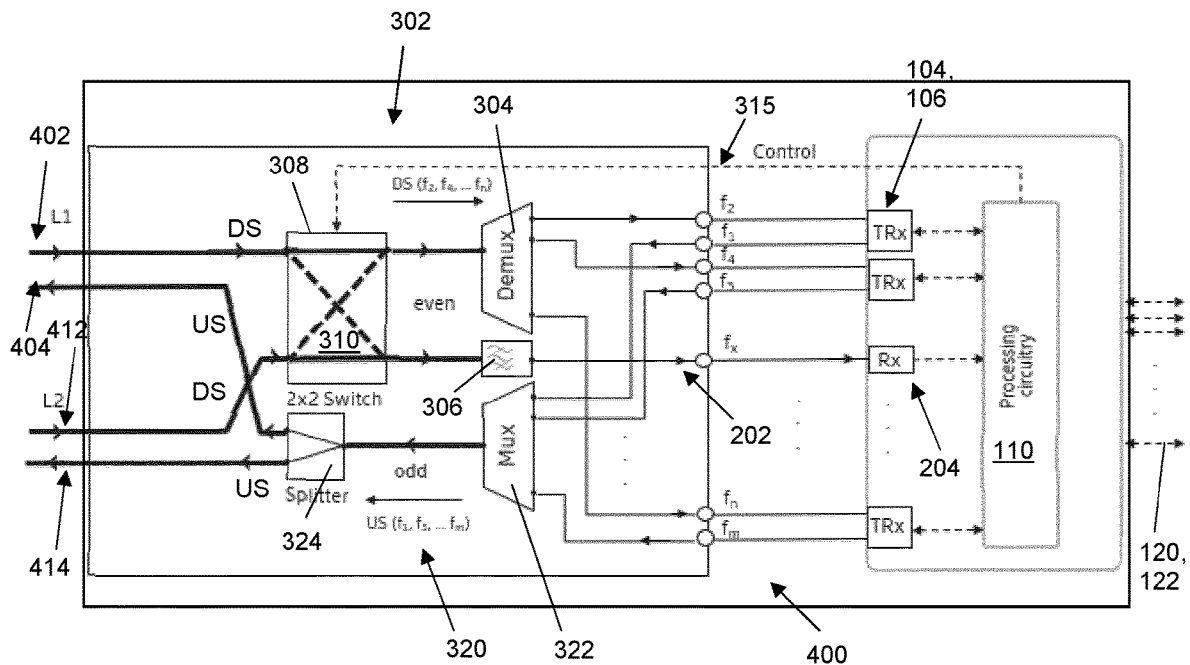

An embodiment of the invention provides a communications network remote node 400, similar to the remote node 300, as illustrated in FIG. 5. The remote node 400 is configured for DFW and therefore does not have the interleavers 112 of the previous embodiment. The first optical link, L1, comprises a first optical fibre 402 for DS optical signals and a second optical fibre 404 for US optical signals. Similarly, second optical link, L2, comprises a first optical fibre 412 for DS optical signals and a second optical fibre 414 for US optical signals.

Figure 6:
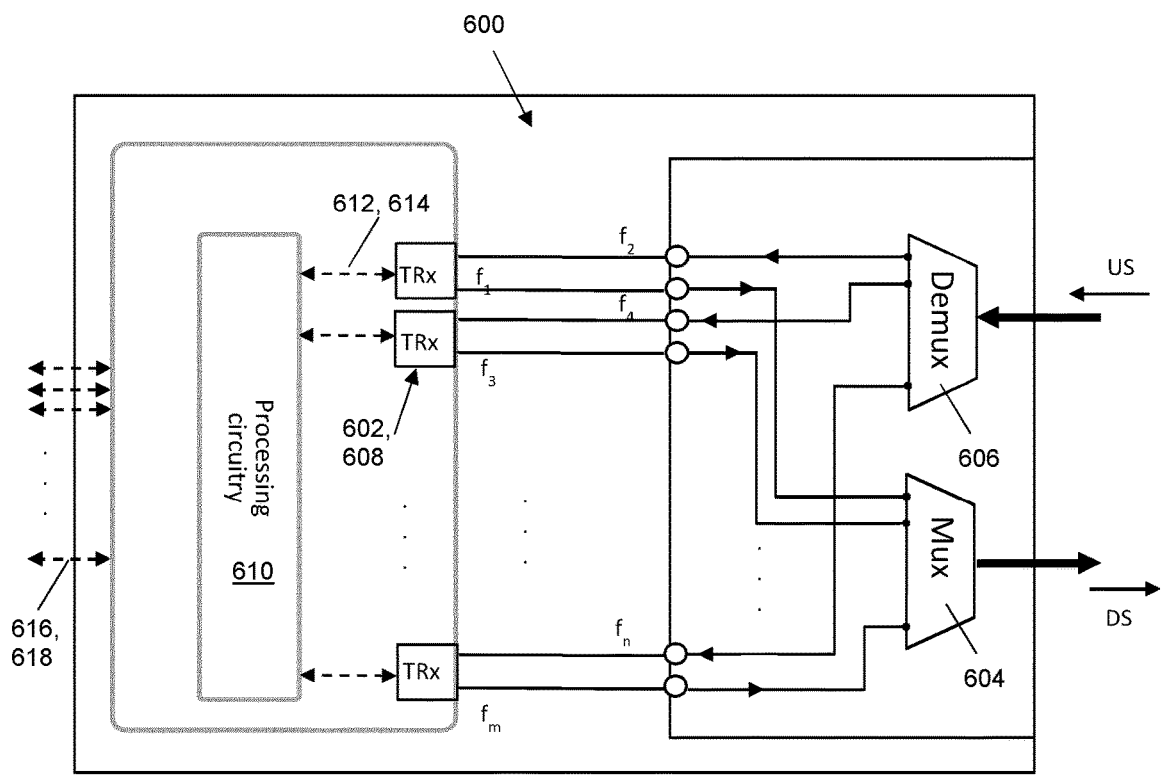
FIG. 6 is a block diagram illustrating a communications network main node according to an embodiment.

An embodiment of the invention provides a communications network main node 600, as illustrated in FIG. 6. The main node 600 is configured to work with a remote node as described in the above embodiments.

The main node 600 comprises optical transmitters 602, an optical multiplexer, mux, 604, an optical demultiplexer, demux, 606, optical receivers 608 and processing circuitry 610.

The optical transmitters 602 and the optical receivers 608 are provided in this example as a plurality of optical transceivers, TRX. The optical transmitters 602 are configured to receive encapsulated downstream, DS, signals 612 and to transmit DS optical signals carrying the encapsulated DS signals at DS wavelengths. The mux 604 is configured to multiplex the DS optical signals carrying the encapsulated downstream signals. The demux 606 is configured to demultiplex upstream, US, optical signals carrying encapsulated US signals. The optical receivers 608 are configured to receive the demultiplexed US optical signals, detect the demultiplexed US optical signals and output encapsulated US signals 614.

The processing circuitry 610 is configured to perform working mode operations of receiving DS client signals 616, for example from a client server, and forming encapsulated DS signals by encapsulating the DS client signals and alignment data. The processing circuitry 610 is also configured to perform a protection mode operation of extracting US client signals 618 and alignment data from the received encapsulated US signals, for routing to, for example, the client server.

In an embodiment, the encapsulated US signals include a destination address, such as a Unicast MAC address or dedicated fields in the US encapsulated client signal, and the processing circuitry is configured to discard encapsulated US signals not addressed to the main node 600.

In an embodiment, the operation of forming encapsulated DS signals comprises inserting the DS client signals into payload parts of frames and inserting alignment data into header parts of the frames. The operation of extracting comprises extracting DS client signals from payload parts of the encapsulated DS client signals and extracting alignment data from header parts of the encapsulated DS client signals.

In an embodiment, the processing circuitry 610 is additionally configured to receive status data indicative of a status relating to the node 600. The processing circuitry 610 is additionally configured to perform an operation of inserting the status data into the header parts of the encapsulated DS client signals. The processing circuitry is additionally configured to perform operations of forming an encapsulated status signal and inserting the status data into a header part of the encapsulated status signal. At least one of the optical transmitters 602 is configured to receive the encapsulated status signal and to transmit at least one DS optical signal carrying the encapsulated status signal. In one embodiment, the encapsulated status signal is simultaneously transmitted on DS optical signals at each of the DS wavelengths.

In an embodiment, the processing circuitry 610 is configured to perform a protection mode operation of receiving status data from the main node 600 (configured as a standby main node). The protection mode operations comprising inserting the status data into the encapsulated DS client signals. A standby main node is thus able to transmit status data to the remote note.

In an embodiment, the status data is indicative of at least one of a status of the standby main node and an alignment status of configuration data of the standby main node. The status data may, for example, comprise an acknowledgement of receipt of configuration data from the active main node or a response to a request from the active main node.

In an embodiment, the processing circuitry 610 is configured to perform an additional working mode operation of extracting protection status data from received encapsulated US signals and to perform an additional protection mode operation of extracting protection status data from received encapsulated US signals. The protection status data indicative of which of the working mode or the protection mode a remote node to which the main node is connected is configured in.

The processing circuitry 610 is additionally configured to cause the main node to change between an active mode configuration and a standby mode configuration dependent on the received protection status data.

The main node 600 may be configured for SFW or DWF, depending on the configuration of the remote node 100, 200, 300 it is to work with.

Figure 7:
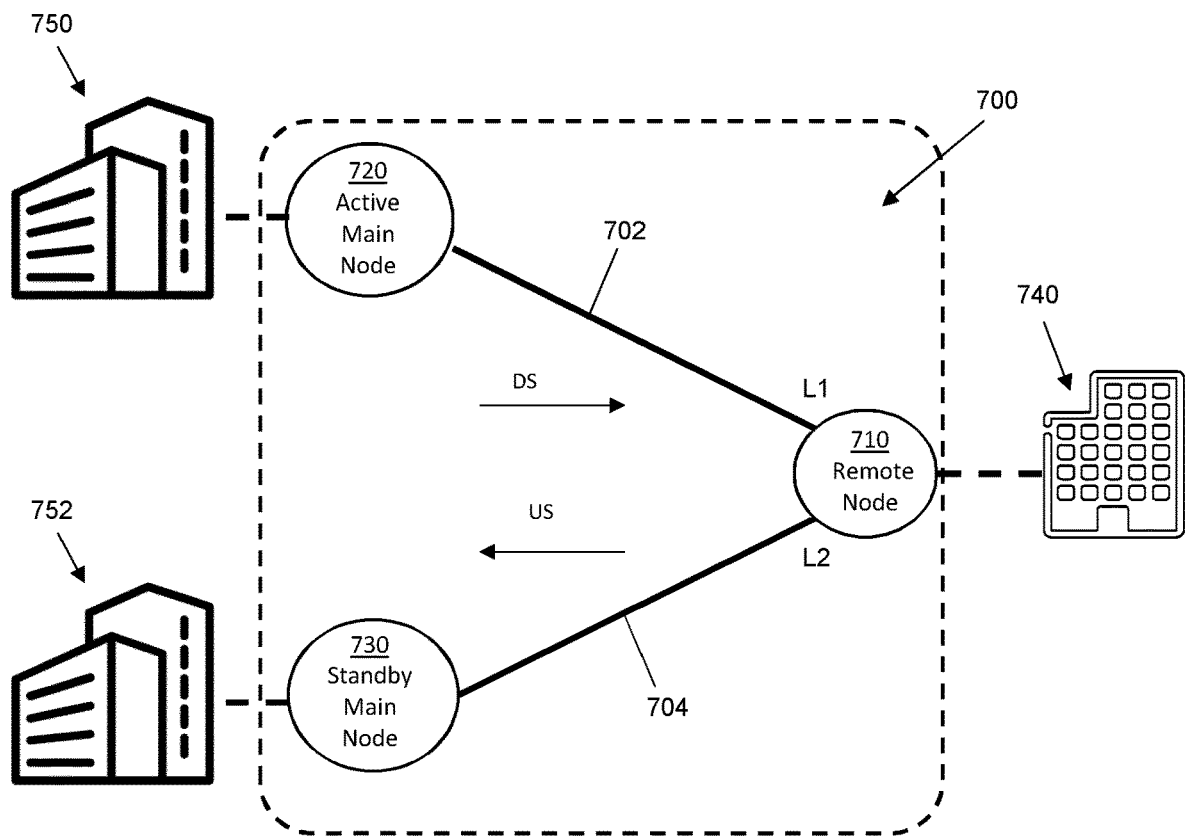
FIGS. 7 and 12 are block diagrams illustrating optical transport networks according to embodiments.

An embodiment provides an optical transport network 700, as illustrated in FIG. 7. The optical transport network 700 comprises a remote node 710, an active main node 720, a standby main node 730, a first optical link L1 and a second optical link L2.

A remote node 100, 200, 300 according to any of the embodiment described above may be used as the remote node 710 and a first main node 600 according to any of the embodiments described above may be used as the active main node 720 and a second main node 600 according to any of the embodiments described above may be used as the standby main node 730.

The first optical link connects the active main node 720 to the remote node and the second optical link L2 connects the standby main node 703 to the remote node. The optical transport network 700 is configured for SFW with the first optical link L1 comprising a first optical fibre 702 and the second optical link comprising a second optical fibre 704. Conventionally in SFW even wavelengths/frequencies are used for the downstream connection (i.e. from Server side to Client side) and odd wavelengths/frequencies are used for the upstream connection (i.e. from Client side to Server side). The opposite could be adopted as an alternative implementation, without affecting operation of the optical transport network 700. The SFW operation is commonly used to save fiber connections, especially in fronthaul.

The optical transport network 700 may equally be configured for DFW, with the first optical link L1 comprising two optical fibres and the second optical link L2 comprising a further two optical fibres, as described above.

FIG. 7 illustrates the optical transport network 700 being used in a C-RAN application; the active and standby main nodes are shown connected respectively to active and standby servers 750, 752 (for example baseband unit hotels, BBH) and the remote node is shown connected to a client unit, such as a remote radio unit, RRU, 704. In this application, the client signals may be framed client signals, such as client signals framed according to the CPRI standard. In an alternative illustrative application where the optical transport network is used as a data centre interconnect, DCI, the main nodes are connected to respective data centre servers and the remote node is connected to a router.

The optical transport network 700 enables a network scenario in which a remote client unit, for example RRU, must be constantly connected to a main server, for example a BBH. The optical transport network 700 enables a disaster recovery protection mechanism that is self-confined within the SFW WDM Optical Transport domain, with no external interaction required. The optical transport network enables a bidirectional communication channel between the active main node and the standby main node. This communication channel is transmitted within the encapsulated DS client signals, for example in the frame header, and enables alignment data to be sent from the active main node to the standby main node so the configuration data of the standby main node can be maintained aligned with the configuration data of the active main node, ready to immediately take over, and able to communicate with the NMS, in case of protection switching being implemented by the remote node 710, for example in response to problems, i.e. any type of failure or disaster, at the main server, the connection between the main server and the active main node or the first optical link, L1.

The optical transponders, at both main nodes and the remote node, enable the protection architecture to be self-confined in the optical domain as they form a demarcation point between the external (Server-Client) domain and the transport domain.

The communication between the main nodes and the remote node, that is to say the transmission of the alignment data, status data and protection status data, will now be described with reference to FIGS. 8 to 12.

Thanks to the DS optical circuit 102, 302, transmission from the active main node 720 to the remote node 710, from the standby main node 730 to the remote node and from the remote node to both main nodes can remain enabled and therefore is possible to realize a bidirectional communication channel between the active main node and the standby main node. In this way, the standby main node (i.e. the main node currently in the standby role) can be constantly aligned to the active main node (i.e. the main node currently in the active role).

The alignment data is encapsulated with the DS client signals and therefore a communication channel is in place between the active main node and the remote node when at least a channel is in service in the system between them.

Figure 8:
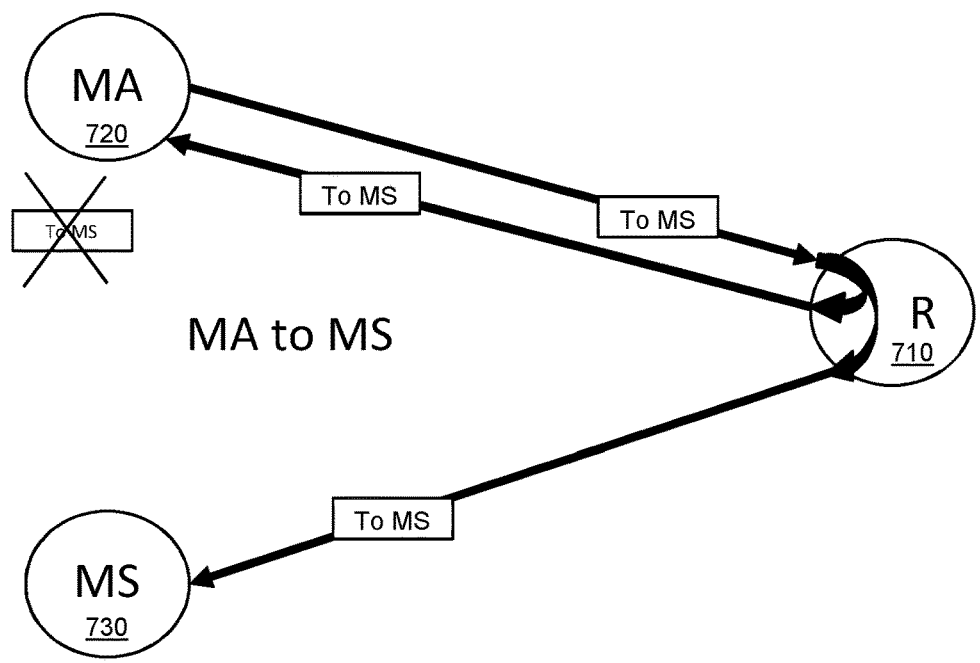
FIGS. 8 to 11 are signalling diagrams illustrating signalling between main active, main standby and remote nodes of optical transport networks according to embodiments.
Figure 9:
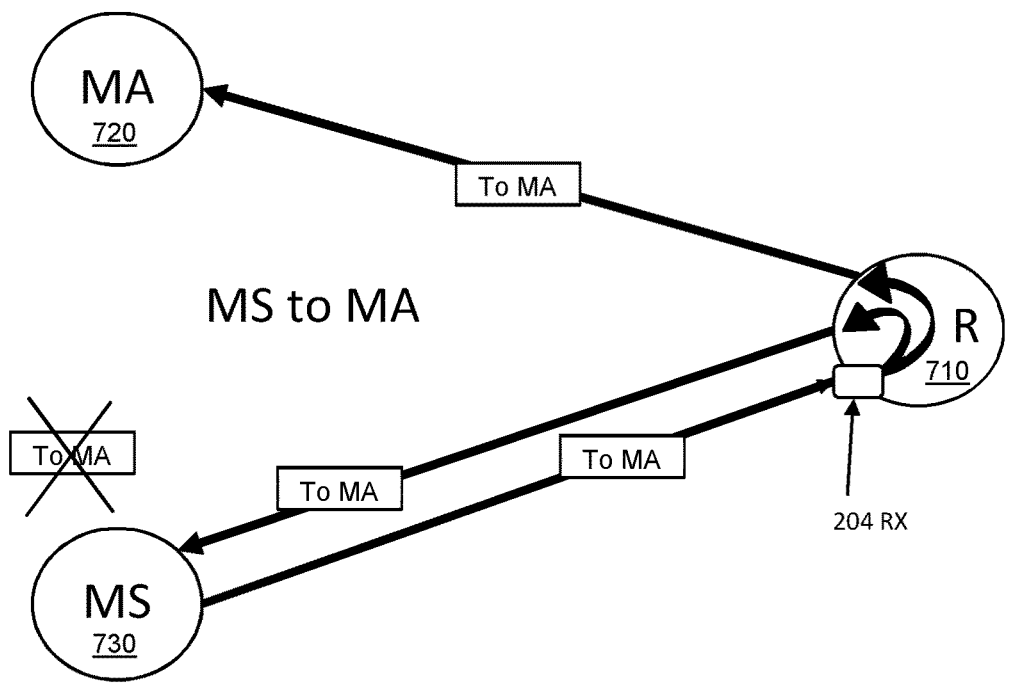
Figure 10:
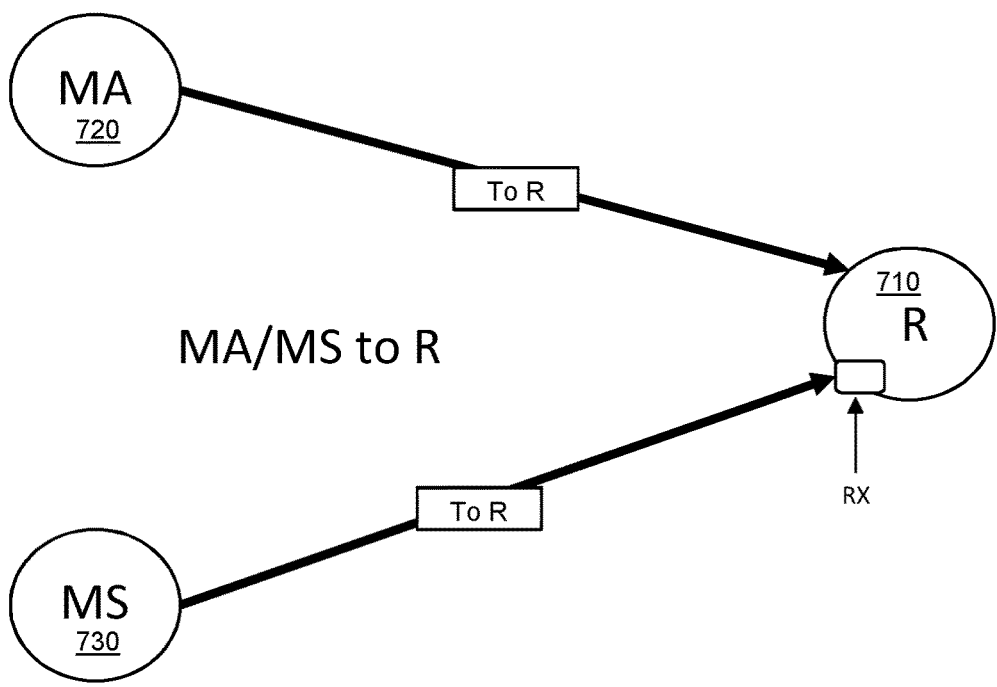

FIG. 8 illustrates communication between the active main node (MA) 720 and standby main node (MS) 730, via the remote node (R) 710: MA sends a message to MS (addressed "To MS") through R; R bi-casts this message to both MA and MS, and MA discards it because the message is not addressed to it. FIG. 9 illustrates the communication between MS and MA, via R: MS sends a message to MA (addressed "To MA") through R (thanks to the dedicated RX 204 for receiving DS optical signals from MS, as described above); R bi-casts this message to both MA and MS, and MS discards the message because it is not addressed to it. FIG. 10 illustrates communication between MS and MA and R: MS and MA send messages to R (addressed "To R"), enabled by the communication channel that is always in place via the DS optical signals sent by MS to the dedicated RX 204 at R).

Figure 11:
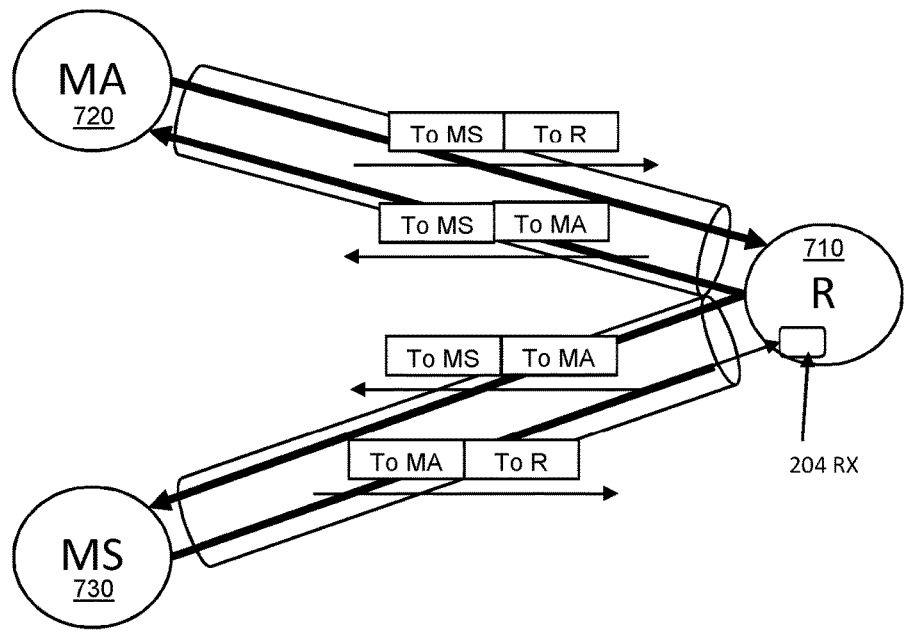

These communications are shown together in FIG. 11. Information sent from MA to MS and vice-versa is physically terminated by R and is then bi-cast from R to both MA and MS. To distinguish the destination of each message, an "address" mechanism such as Unicast MAC or also dedicated fields in the frame for each unit (MA, MS, R) can be used so that each unit, according to its own role can properly elaborate only the bytes directed to it.

For each communication channel, that is from MA to MS, MS to MA, MA to R and MS to R, a proper set of bytes in the frame can be defined or specifically reserved, whether a proprietary or a standard frame structure (e.g. OTN) is used. The optical transport network 700 enables this communication to be realized at a layer as close as possible to the physical layer, i.e. Layer 1, to simplify hardware and minimize processing time.

The number of bytes that must be reserved in the frame depends on the overall bitrates of the connections between MA, MS and R, but in general an equivalent 100 Mbps or 1000 Mbps is considered to be enough for transmission of alignment data, such as configuration data, from the active main node to the standby main node, and for transmission of status data, such as a status of the respective main node and an alignment status of the configuration data of the standby main node, as well as all information necessary for R to take decisions on protection switching related to disaster recovery.

Since R is the entity that takes all decision about protection switching, both MA and MS must communicate their status to R; this can be sent as part of the status data, for example as a heartbeat coded as two bits in specific bytes of the frame overhead. Information about the status of a standby server connected to the standby main node and alarms related to the connection of the standby server to the standby main node can also be communicated to R as part of the status data, so that R can make a protection switching decision taking this information into account also.

Protection switching decisions are made by the processing circuitry at the remote node, R, based on the status data that it receives, including loss of signal on even frequencies (LOS), or alarms such as loss of frame (LOF), link loss forwarding (LLF), bit error rate (BER), the heartbeat from both MA and MS.

The processing circuitry at R is configured to determine the best criterion to use for switching, such as, for instance, criterion based on all DS optical signals being out of service, on a majority being out of service, on one or more DS optical signals designated as priority signals being out of service, on a combination of the alarms or other criteria.

The Protection Status (PS) is coded in two bits in the frame and sent constantly in both messages «To MS» and «To MA». (e.g. PS=10 in working mode operation; PS=01 in protection mode operation).

In the working mode, traffic from the active server 750 is sent to the client 740 through the active main node 720, selected by the 2×2 switch in the DS optical circuit in the remote node, R, 710. The protection status is coded as "Working Mode", 10. The auxiliary Rx 204 is configured to receive DS optical signals carrying encapsulated DS signals from the standby main node 730. The encapsulated DS signals from the standby main node comprise status signals comprising status data relating to a status of the standby main node 730 and/or an alignment status of the configuration data of the standby main node.

When the switching criteria are met, the remote node 710 commutates the 2×2 switch and the PS is set to "Protection Mode". 01. The standby main node 730, detects that the PS is set to "Protection Mode" and immediately assumes the active role, including taking over communication with the NMS, and advises the standby server 752 to become active.

The protection switching may be non-revertive; once the issue that caused the protection switching to take place is repaired, the optical transport network 700 allows that the alignment can be done in reverse order and when completed it is preferable to perform a manual switch back to the original roles for the main nodes 720.

The main nodes 720, 730 may share the same management IP address over a data communication channel, DCN, to enable seamless functioning of the system even in case of disaster. In order to avoid conflicts in the DCN, a management interface may be activated on the active main node only and appropriate measures (e.g. gratuitous ARP triggered by main node role change from active to standby) will have to be taken to ensure quick convergence of DCN when protection switching occurs. The optical transport network 700 ensure that just one main node is active at any given time while at the same time allowing alignment of the configuration data of the standby main node with that of the active main node.

The optical transport network 700 is able to provide protection switching a range of fault types, including:
Disaster on Active Server 750 to be recovered and/or failure of active main node client signals, which can be communicated to the remote node 710 by dedicated bytes of the client signal frame.
Hardware or software fault at the active main node which does not cause the optical transmitter/s to turn off. This failure can be detected at the remote node as a result of status data (heartbeat) not being received from the active main node.
Failure of the WDM optical link L1, L2 or a hardware fault at a main node which causes the optical transmitters to be all switched off. This failure can be detected at the remote node as a loss of signal (LOS) alarm and/or lack of status data (heartbeat) being received from the main node.

Figure 12:
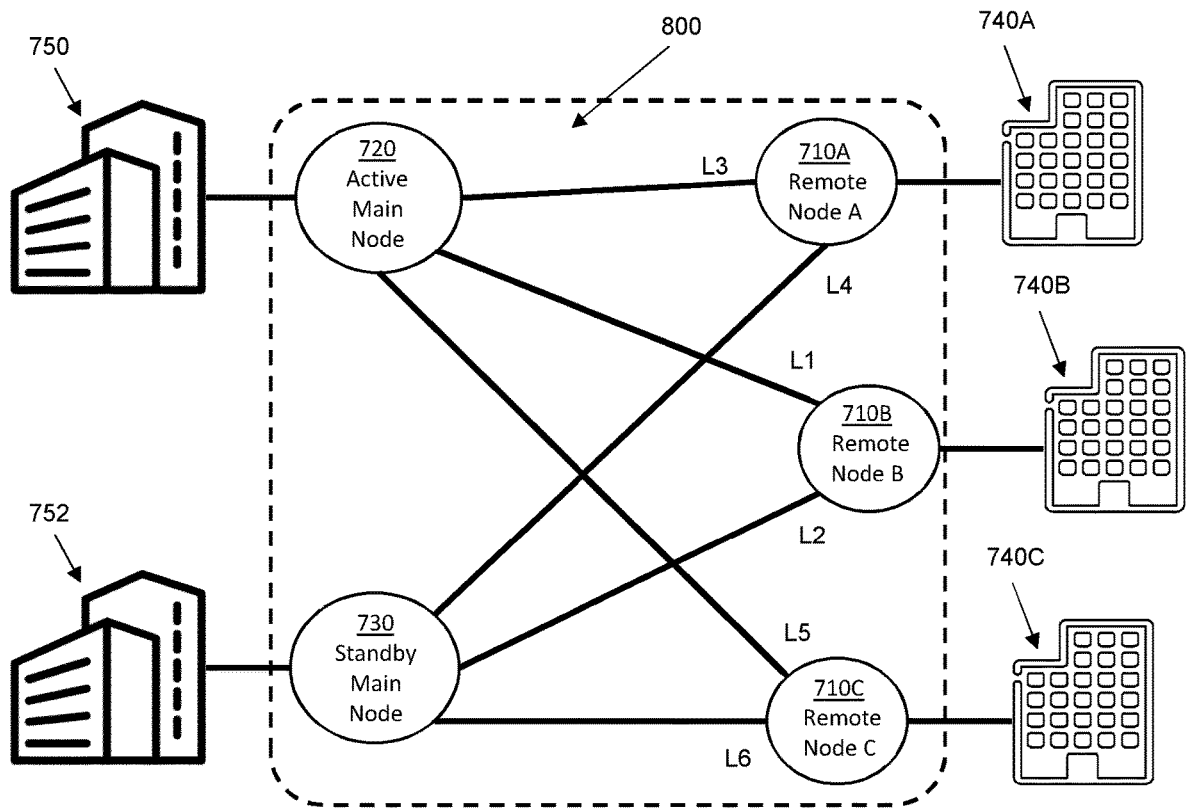

An embodiment provides an optical transport network 800, as illustrated in FIG. 12. The optical transport network comprises a plurality of remote nodes, in this example three remote nodes 710A, 710B, 710C. The remote nodes 710 are each connected to the active main node 720 and the standby main node 730 by a respective pair of optical links, L1 and L2, L3 and L4, L5 and L6. Each remote node 710, the active main node 720, the standby main node 730 and the two respective optical links form a group within the optical transport network, with each group operating in the manner described above with reference to the optical transport network 700 of FIG. 7.

Figure 13:
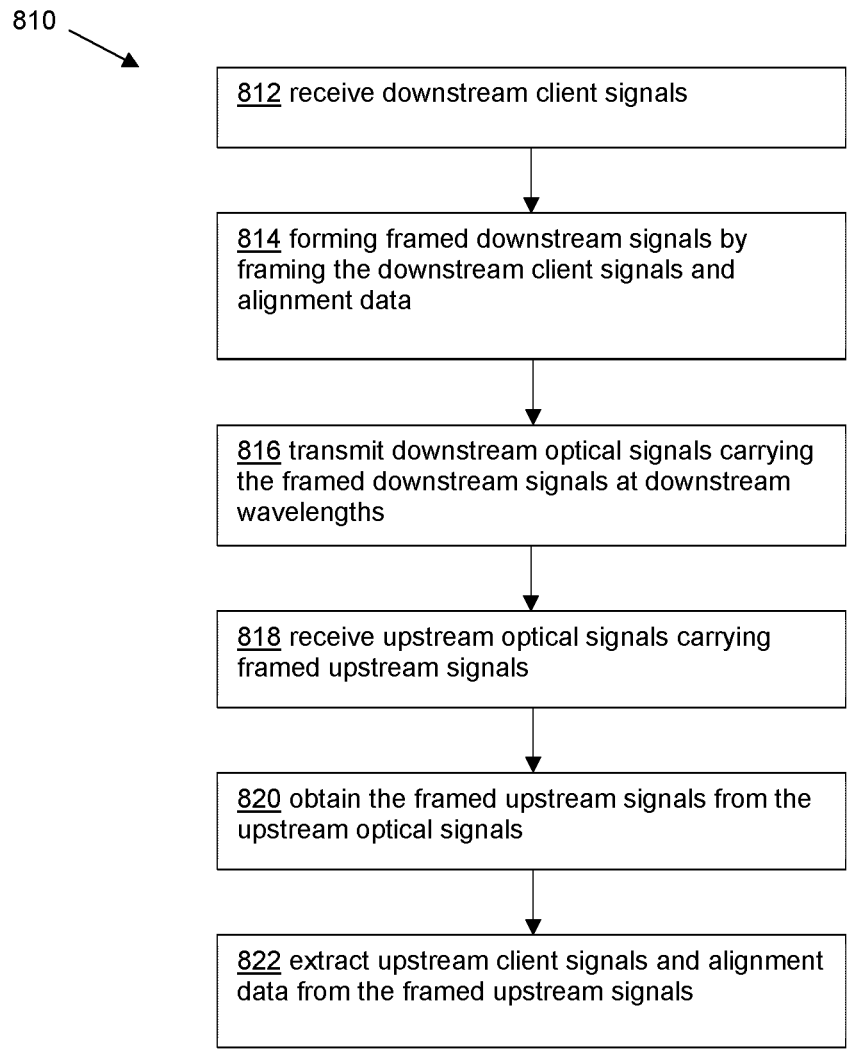
FIGS. 13 to 15 are flow diagrams illustrating steps of methods according to embodiments.
Figure 14:
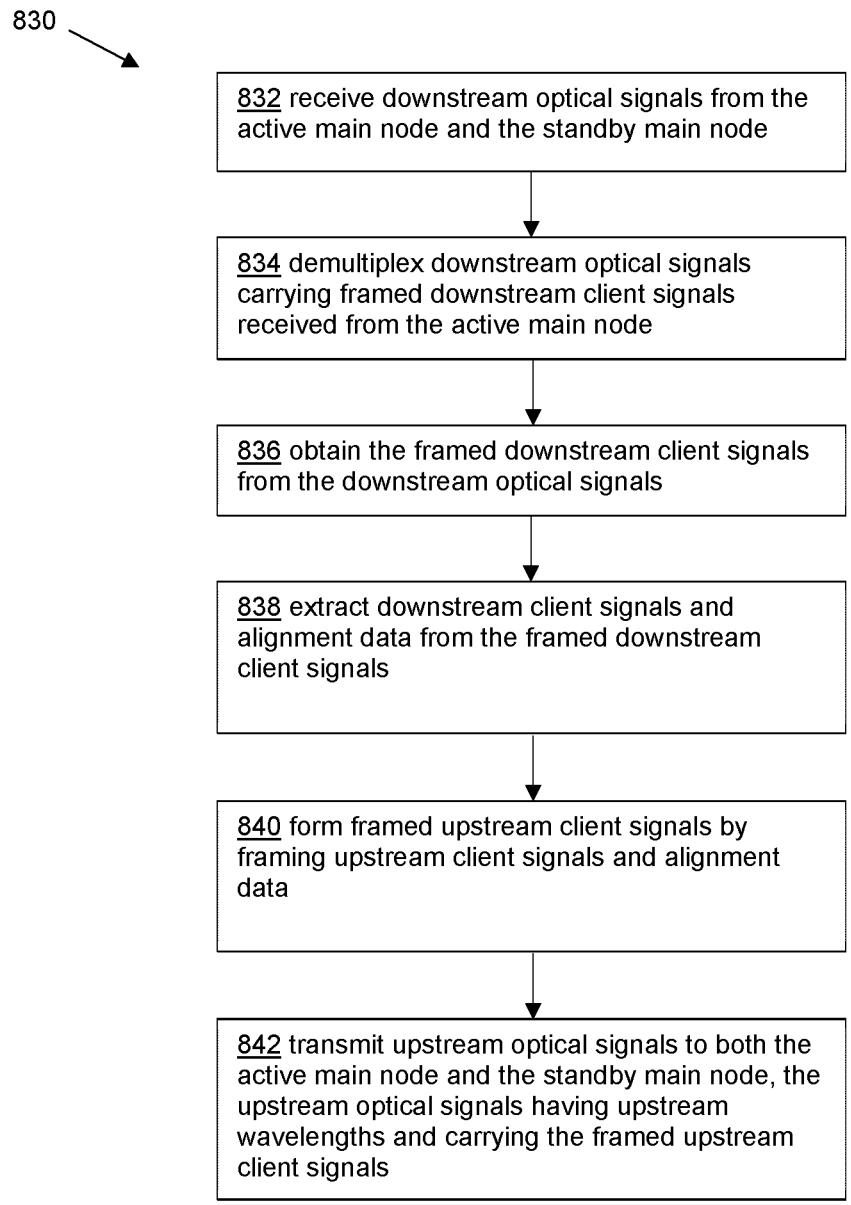

An embodiment provides a method of optical transport network failure protection, as illustrated in FIGS. 13 and 14.

The method comprises steps 810 performed at an active main node and steps 830 performed at a remote node.

The steps 810 performed at the active main node comprise:
- receiving 812 downstream, DS, client signals and forming (814) encapsulated DS signals by encapsulating the DS client signals and alignment data;
- transmitting 816 DS optical signals carrying the encapsulated DS signals at DS wavelengths;
- receiving 818 upstream, US, optical signals carrying encapsulated US signals;
- obtaining 820 the encapsulated US signals from the US optical signals; and
- extracting 822 US client signals and alignment data from the encapsulated US signals.

The steps 830 performed at the remote node comprise:
- receiving 832 DS optical signals from the active main node and the standby main node;
- demultiplexing 834 DS optical signals carrying encapsulated DS client signals received from the active main node;
- obtaining 836 the encapsulated DS client signals from the DS optical signals;
- extracting 838 DS client signals and alignment data from the encapsulated DS client signals;
- forming 840 encapsulated US client signals by encapsulating US client signals and alignment data; and
- transmitting 842 US optical signals to both the active main node and the standby main node, the US optical signals having US wavelengths and carrying the encapsulated US client signals.

Figure 15:
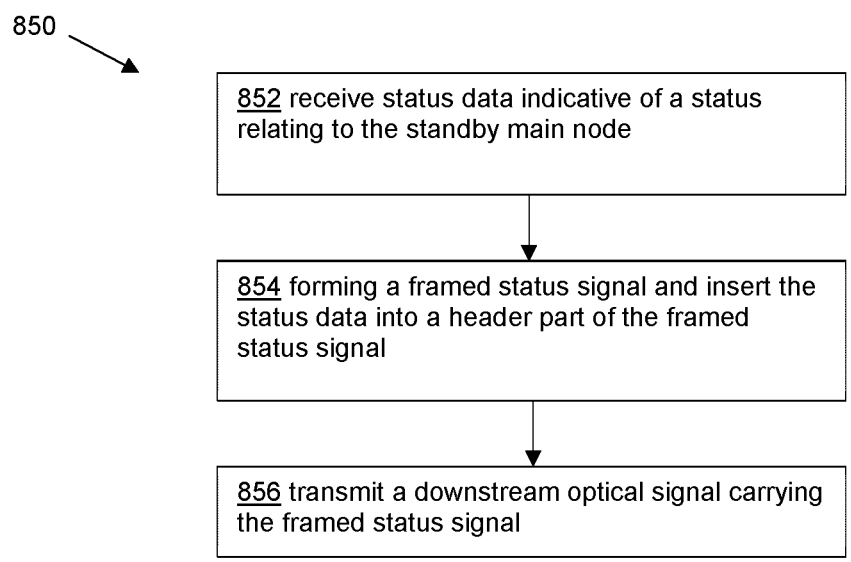

An embodiment the method of optical transport network failure protection includes additional steps 850 at a standby main node and additional steps at the remote node, as illustrated in FIG. 15

The additional steps 850 at the standby main node comprise:
- receiving 852 status data indicative of a status relating to the standby main node;
- forming 854 an encapsulated status signal and inserting the status data into a header part of the encapsulated status signal; and
- transmitting 856 a DS optical signal carrying the encapsulated status signal.

The additional steps at the remote node comprise:
- receiving the DS signal carrying the encapsulated status signal; and
- extracting the status data from the encapsulated status signal.

In an embodiment, the method further comprises, at the remote node, a step of extracting status data from header parts of the encapsulated downstream client signals. The status data is indicative of a status relating to the main node from which the downstream client signals are received.

In an embodiment, the method further comprises, at the remote node, a step of determining a protection status based on the status data and a step of inserting protection status data into the encapsulated upstream client signals. The protection status data is indicative of which of a working mode or a protection mode the remote node is operating in.

In an embodiment, the method further comprises, at the active main node and at the standby main node, steps of extracting the protection status data from the encapsulated upstream signals.

In an embodiment, the method further comprises, at the active main node, a step of inserting status data into the downstream client signals. The status data is indicative of a status relating to the active main node.

The invention claimed is:

1. A communications network remote node comprising:
a downstream optical circuit configured to receive downstream, DS, optical signals at downstream wavelengths from an active main node and from a standby main node, the downstream optical circuit switchable between a working mode and a protection mode, in the working mode the downstream optical circuit is configured to demultiplex downstream optical signals carrying encapsulated client signals received from the active main node and in the protection mode the downstream optical circuit is configured to demultiplex downstream optical signals carrying encapsulated client signals received from the standby main node;
a plurality of optical receivers configured to receive the demultiplexed downstream optical signals and output encapsulated downstream client signals;
a plurality of optical transmitters configured to receive encapsulated upstream client signals and to transmit upstream, US, optical signals at upstream wavelengths carrying the encapsulated upstream client signals;
an upstream optical circuit configured to multiplex the upstream optical signals carrying the encapsulated upstream client signals and to send the upstream optical signals to both the active main node and the standby main node; and
processing circuitry configured to:
extract downstream client signals and alignment data from encapsulated downstream client signals; and
form encapsulated upstream client signals by encapsulating upstream client signals and alignment data.

2. The communications network remote node as claimed in claim 1, wherein the downstream optical circuit comprises:
an optical demultiplexer configured to demultiplex the downstream optical signals carrying encapsulated client signals; and
an optical switch comprising:
a first input configured to receive the downstream optical signals from the active main node;
a second input configured to receive the downstream optical signals from the standby main node;
a first output connected to the optical demultiplexer;
a second output connected to an optical bandpass filter; and
a 2×2 switch fabric interconnecting the first and second inputs with the first and second outputs, wherein the 2×2 switch fabric is reconfigurable to switch between the working mode and the protection mode.

3. The communications network remote node as claimed in claim 1, further comprising an auxiliary optical receiver configured to receive a downstream optical signal from the standby main node in the working mode and to receive a downstream optical signal from the active main node in the protection mode, the downstream optical signal carrying an encapsulated status signal from the respective main node, and wherein the auxiliary optical receiver is configured to output the encapsulated status signal and the processing circuitry is further configured to extract status data from the encapsulated status signal, the status data indicative of a status relating to the respective main node.

4. The communications network remote node as claimed in claim 3, wherein the status data is indicative of an alignment status of alignment data of the respective main node and wherein the processing circuitry is further configured to encapsulate the status data with the upstream client signals and the alignment data.

5. The communications network remote node as claimed in claim 3, wherein the downstream optical circuit additionally comprises an optical bandpass filter configured to select one of a plurality of downstream optical signals received from the standby main node in the working mode and to select one of a plurality of downstream optical signals received from the active main node in the protection mode, the downstream optical signals each carrying the encapsulated status signal from the respective main node.

6. The communications network remote node as claimed in claim 5, wherein the optical bandpass filter is a tunable optical bandpass filter configurable to select one of a plurality of downstream optical signals carrying the status signal.

7. The communications network remote node as claimed in claim 1, wherein the processing circuitry is additionally configured to perform extracting status data from encapsulated downstream client signals, the status data indicative of a status relating to the main node from which the downstream optical signals carrying the encapsulated downstream client signals are received.

8. The communications network remote node as claimed in claim 7, wherein the processing circuitry is further configured to perform determining a protection status based on the status data and generating a control signal configured to cause the downstream optical circuit to switch between the working mode and the protection mode.

9. The communications network remote node as claimed in 1, wherein the processing circuitry is further configured to perform inserting protection status data into the encapsulated upstream client signals, the protection status data indicative of which of the working mode or the protection mode the downstream optical circuit is configured in.

10. The communications network remote node as claimed in claim 1, wherein the processing circuitry is configured to:
   extract downstream client signals from payload parts of the encapsulated downstream client signals and to extract alignment data from header parts of the encapsulated downstream client signals; and
   form encapsulated upstream client signals by inserting upstream client signals into payload parts of frames and inserting alignment data into header parts of the frames.

11. A communications network main node comprising:
   a plurality of optical transmitters configured to receive encapsulated downstream signals and to transmit downstream, DS, optical signals carrying the encapsulated downstream signals at downstream wavelengths;
   an optical multiplexer configured to multiplex the downstream optical signals carrying the encapsulated downstream signals;
   an optical demultiplexer configured to demultiplex upstream, US, optical signals carrying encapsulated upstream signals;
   a plurality of optical receivers configured to receive the demultiplexed upstream optical signals and output encapsulated upstream signals; and
   processing circuitry configured to perform working mode operations of:
      receiving downstream client signals and forming encapsulated downstream signals by encapsulating the downstream client signals and alignment data;
      extracting upstream client signals and alignment data from encapsulated upstream signals;
      receive status data indicative of a status relating to the node, the working mode operations further comprising inserting the status data into the header parts of the encapsulated downstream client signals; and
   perform protection mode operations of forming an encapsulated status signal and inserting the status data into a header part of the encapsulated status signal; and
   at least one of the optical transmitters being configured to receive the encapsulated status signal and to transmit at least one downstream optical signal carrying the encapsulated status signal.

12. The communications network main node as claimed in claim 11, wherein forming encapsulated downstream signals comprises inserting the downstream client signals into payload parts of frames and inserting alignment data into header parts of the frames; and
   the extracting comprises extracting upstream client signals from payload parts of the encapsulated upstream client signals and extracting alignment data from header parts of the encapsulated upstream client signals.

13. The communications network main node as claimed in claim 11, wherein the processing circuitry is configured to receive status data indicative of an alignment status of alignment data of the standby main node and the protection mode operations comprise inserting the status data into the encapsulated status signals.

14. An optical transport network comprising:
   a communications network remote node comprising:
      a downstream optical circuit configured to receive downstream, DS, optical signals at downstream wavelengths from an active main node and from a standby main node, the downstream optical circuit switchable between a working mode and a protection mode, in the working mode the downstream optical circuit is configured to demultiplex downstream optical signals carrying encapsulated client signals received from the active main node and in the protection mode the downstream optical circuit is configured to demultiplex downstream optical signals carrying encapsulated client signals received from the standby main node;
      a plurality of optical receivers configured to receive the demultiplexed downstream optical signals and output encapsulated downstream client signals;
      a plurality of optical transmitters configured to receive encapsulated upstream client signals and to transmit upstream, US, optical signals at upstream wavelengths carrying the encapsulated upstream client signals;
      an upstream optical circuit configured to multiplex the upstream optical signals carrying the encapsulated upstream client signals and to send the upstream optical signals to both the active main node and the standby main node; and
      processing circuitry configured to:
         extract downstream client signals and alignment data from encapsulated downstream client signals; and
         form encapsulated upstream client signals by encapsulating upstream client signals and alignment data;
   an active communications network main node, comprising:
      a plurality of optical transmitters configured to receive encapsulated downstream signals and to transmit downstream, DS, optical signals carrying the encapsulated downstream signals at downstream wavelengths;

an optical multiplexer configured to multiplex the downstream optical signals carrying the encapsulated downstream signals;
an optical demultiplexer configured to demultiplex upstream, US, optical signals carrying encapsulated upstream signals;
a plurality of optical receivers configured to receive the demultiplexed upstream optical signals and output encapsulated upstream signals; and
processing circuitry configured to perform working mode operations of:
receiving downstream client signals and forming encapsulated downstream signals by encapsulating the downstream client signals and alignment data; and
extracting upstream client signals and alignment data from encapsulated upstream signals;
a standby communication network main node comprising:
a plurality of optical transmitters configured to receive encapsulated downstream signals and to transmit downstream, DS, optical signals carrying the encapsulated downstream signals at downstream wavelengths;
an optical multiplexer configured to multiplex the downstream optical signals carrying the encapsulated downstream signals;
an optical demultiplexer configured to demultiplex upstream, US, optical signals carrying encapsulated upstream signals;
a plurality of optical receivers configured to receive the demultiplexed upstream optical signals and output encapsulated upstream signals; and
processing circuitry configured to perform working mode operations of:
receiving downstream client signals and forming encapsulated downstream signals by encapsulating the downstream client signals and alignment data; and
extracting upstream client signals and alignment data from encapsulated upstream signals;
a first optical link between the active communications network main node and the communications network remote node; and
a second optical link between the standby communications network main node and the communications network remote node.

15. A method of optical transport network failure protection, the method comprising:
at an active main node:
receiving downstream client signals and forming encapsulated downstream signals by encapsulating the downstream client signals and alignment data;
transmitting downstream optical signals carrying the encapsulated downstream signals at downstream wavelengths;
receiving upstream optical signals carrying encapsulated upstream signals;
obtaining the encapsulated upstream signals from the upstream optical signals; and
extracting upstream client signals and alignment data from the encapsulated upstream signals;
at a standby main node:
receiving status data indicative of a status relating to the standby main node;
forming an encapsulated status signal and inserting the status data into a header part of the encapsulated status signal; and
transmitting a downstream optical signal carrying the encapsulated status signal; and
at a remote node:
receiving downstream optical signals from the active main node and the standby main node;
receiving the downstream signal carrying the encapsulated status signal;
extracting the status data from the encapsulated status signal;
demultiplexing downstream optical signals carrying encapsulated downstream client signals received from the active main node;
obtaining the encapsulated downstream client signals from the downstream optical signals;
extracting downstream client signals and alignment data from the encapsulated downstream client signals;
forming encapsulated upstream client signals by encapsulating upstream client signals and alignment data; and
transmitting upstream optical signals to both the active main node and the standby main node, the upstream optical signals having upstream wavelengths and carrying the encapsulated upstream client signals.

16. The method as claimed in claim 15, further comprising at the remote node:
determining a protection status based on the status data; and
inserting protection status data into the encapsulated upstream client signals, the protection status data indicative of which of a working mode or a protection mode the remote node is operating in.

17. The method as claimed in claim 16, further comprising at the active main node and at the standby main node extracting the protection status data from the encapsulated upstream signals.

18. The method as claimed in claim 15, further comprising at the active main node inserting status data into the downstream client signals, the status data indicative of a status relating to the active main node.

* * * * *